United States Patent [19]
Han

[11] Patent Number: 5,398,114
[45] Date of Patent: Mar. 14, 1995

[54] CIRCUIT FOR COMPENSATING FOR THE DROP-OUT OF A REPRODUCED VIDEO SIGNAL

[75] Inventor: Hong-kyu Han, Suwon, Rep. of Korea

[73] Assignee: SamSung Electronics Co., Ltd., Kyungki-do, Rep. of Korea

[21] Appl. No.: 763,294

[22] Filed: Sep. 20, 1991

[51] Int. Cl.⁶ ............................................. H04N 5/94
[52] U.S. Cl. .................... 358/336; 360/38.1; 348/616; 358/314
[58] Field of Search ............. 358/314, 336, 174, 163, 358/167, 335; 360/38.1; H04N 5/94; 348/616

[56] References Cited

U.S. PATENT DOCUMENTS

| | | | |
|---|---|---|---|
| 4,122,489 | 10/1978 | Bolger et al. | 358/314 |
| 4,398,210 | 8/1983 | Liu et al. | 358/167 |
| 5,010,416 | 4/1991 | Yasumura et al. | 358/314 |

FOREIGN PATENT DOCUMENTS

| | | |
|---|---|---|
| 0152883 | 6/1989 | Japan . |
| 0349491 | 3/1991 | Japan . |

Primary Examiner—Tommy P. Chin
Assistant Examiner—Huy Nguyen
Attorney, Agent, or Firm—Robert E. Bushnell

[57] ABSTRACT

A drop-out compensator for a video reproducing apparatus comprises a switch device for selectively outputting a reproduced video signal and a 1H-delayed signal in response to a drop-out detecting signal, a 1H delay circuit for delaying a video signal whose drop-out is compensated and which is output via the switch device, and an automatic level control device for comparing the synchronous signal levels of the reproduced video signal and 1H-delayed signal, amplifying the 1H-delayed signal output from the 1H delay circuit in response to the result of the comparison, thereby adjusting the level of the 1H-delayed signal to be supplied to the switch device to match that of the reproduced video signal. The compensator can automatically adjust the amplitude of a drop-out-compensated signal by comparing the levels of the synchronous signal of a reproduced video signal and the synchronous signal of a 1H-delayed signal and matching the amplitudes of 1H-delayed signal and the reproduced video signal.

22 Claims, 2 Drawing Sheets

CIRCUIT FOR COMPENSATING FOR THE DROP-OUT OF A REPRODUCED VIDEO SIGNAL

BACKGROUND OF THE INVENTION

The present invention relates to a video signal playback apparatus, and more particularly to a circuit for compensating for a drop-out of a reproduced video signal which is caused by damage or defects in the magnetism of the video tape in a video tape recorder (VTR) or video cassette recorder (VCR).

In general, when drop-out (loss of signal due to damage to a tape or its magnetism) occurs, an apparatus for compensating for the loss of reproduced FM signal signals in a video signal reproducing apparatus counteracts the drop-out by outputting a delayed video signal from a 1H delay circuit. In other words, a one horizontal scan line delayed (1H-delayed) signal is selected and outputted instead of the original signal in response to a detecting pulse produced when, the drop-out occurs. Since television signals have a close line correlation between one another, that is, signals before and after a 1H delay are almost identical, their drop-out can be completely compensated for. However, if the amplitude levels do not match when attempting to adjust the output level of the 1H delay circuit to that of the original signal, the compensation effect lessens, and sometimes the quality of picture suffers.

FIG. 1 shows a conventional drop-out compensator. Referring to FIG. 1, the resistance of variable resistor VR is adjusted to set the output level of a 1H delay circuit to that of the original signal. At this time, since the user sets the level while watching a screen, the levels are difficult to match precisely. Further, exact settings will vary according to the one who adjusts, the level and in particular will shift due to the variation of the resistance according to vibration and temperature, resulting in the above mentioned problems.

SUMMARY OF THE INVENTION

Therefore, it is an object of the present invention to provide an advanced drop-out compensator to obviate the above described problems.

To achieve the above object, the drop-out compensator of the present invention comprises:
  a switching device for selectively outputting a reproduced video signal and a 1H delayed signal in response to a drop-out detecting signal;
  a 1H delay circuit for 1H-delaying a video signal whose drop-out is compensated and which is output via the switching device; and
  an automatic level control device for comparing the amplitudes of the synchronous signals of the reproduced video signal and the 1H-delayed signal, amplifying the 1H-delayed signal output from the 1H delay circuit in response to the result of the comparison, and adjusting the level of the 1H-delayed signal supplied to the device to match that of the reproduced video signal.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

Figure 1:
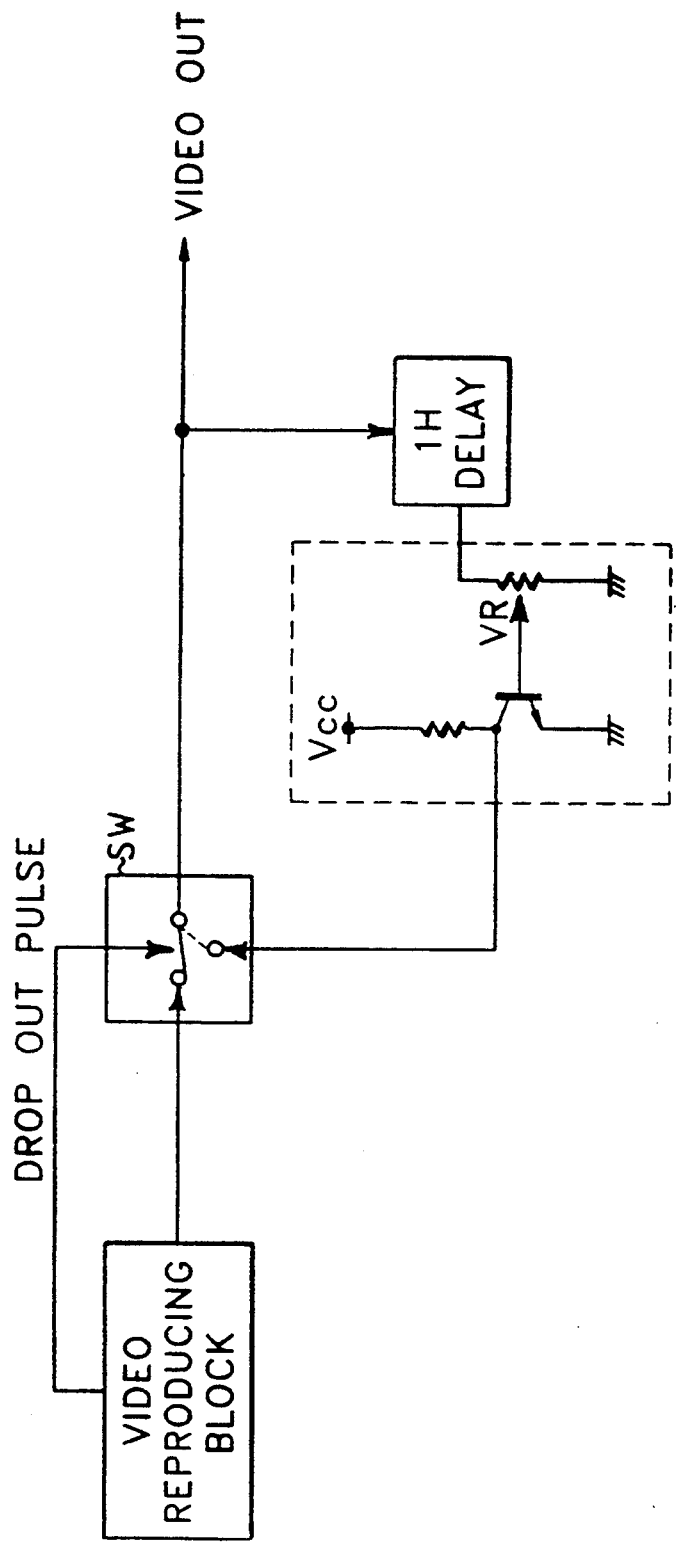
FIG. 1 is a circuit diagram of a conventional drop-out compensator.
Figure 2:
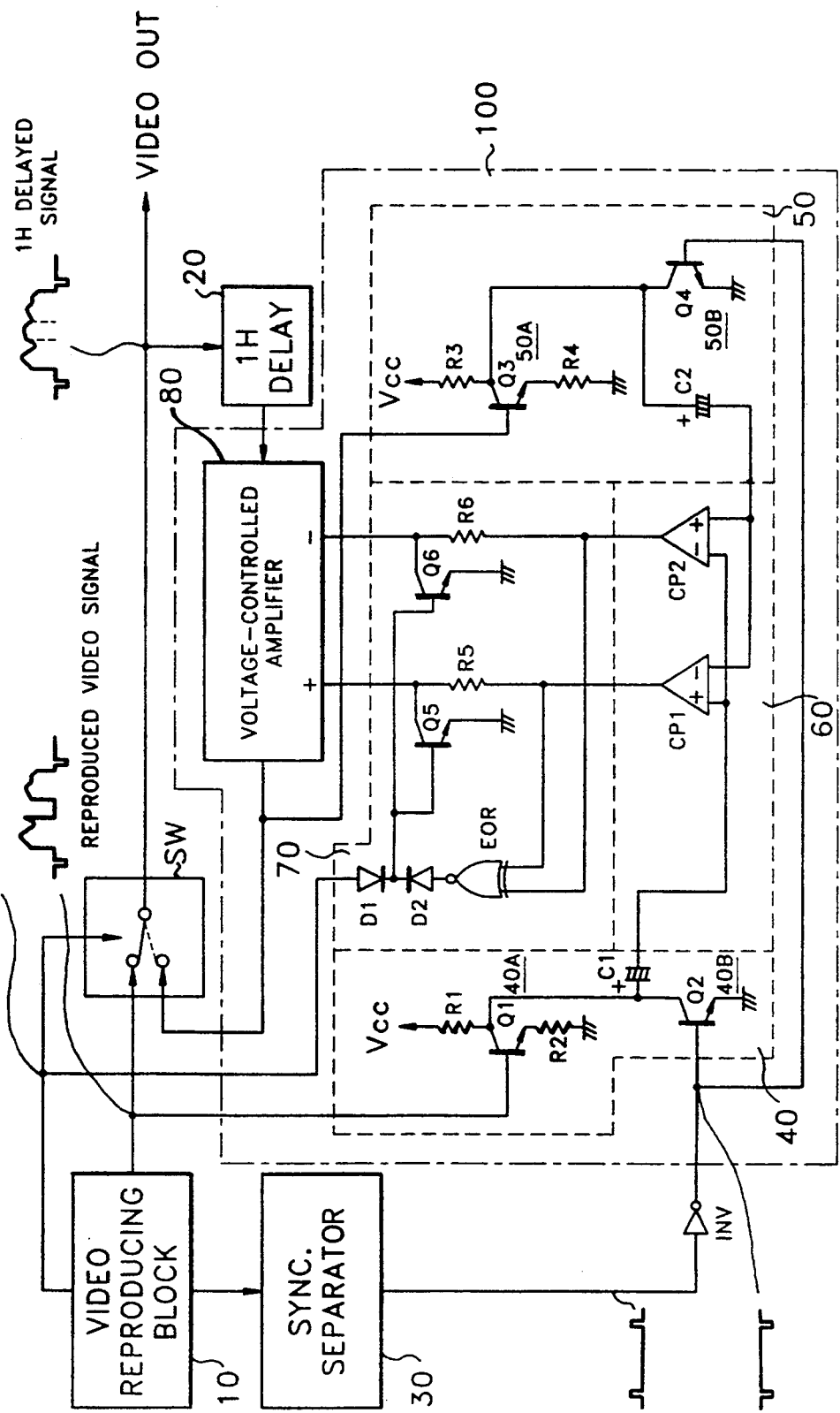
FIG. 2 is a circuit diagram of a drop-out compensator of the present invention.

Referring to FIG. 2, reference numeral 10 represents a well-known video reproducing block, Video reproducing block 10 outputs a video signal reproduced from magnetic tape and a drop-out detecting signal, The drop-out detecting signal has a pulse width corresponding to the portion of the reproduced video signal which has lost amplitude. The reproduced video signal or a 1H-delayed video signal via 1H delay circuit 20 are selectively outputted by analog switch SW. 1H delay circuit 20 inputs a video signal passing through analog switch SW. Analog switch SW is controlled by the drop-out detecting signal, so that when there is no loss in the reproduced video signal, analog switch SW passes the reproduced video signal, but when a loss exists, the 1H-delayed video signal is selected. Thus, the 1H-delayed signal is inserted into the video signal passing through analog switch SW, compensating for the drop-out of the video signal. If the levels of the reproduced video signal and 1H-delayed signal do not match, the quality of picture worsens where the two signals join. Therefore, the two amplitudes must match.

Reference numeral 100 represents an automatic level control (ALC) device. ALC circuit 100 comprises first and second synchronous signal extractors 40 and 50, comparator 60, a faulty operation preventing circuit 70, and a voltage-controlled amplifier 80. A synchronous separator 30 receives as an input a composite video signal reproduced from video reproducing block 10, separates the horizontal synchronous signal from the composite video signal, and provides the output to an inverter INV.

First synchronous signal extractor 40 inverts the reproduced video signal using an inverting amplifier 40A which consists of transistor Q1 and resistors R1 and R2, then extracts and outputs only a synchronous signal from the inverted video signal using muting device 40B which consists of transistor Q2 and coupling capacitor C1. Responding to the inverted horizontal synchronous signal input of muting device 40B, transistor Q2 of muting device 40B is turned off during the horizontal synchronous period and otherwise is turned on to mute the video signal.

The second synchronous signal extractor 50 receives the output of voltage-controlled amplifier 80 and extracts only the synchronous signal from the 1H-delayed signal. Since the structure and operation of the second synchronous signal extractor 50 is same as the first synchronous signal extractor 40, a detailed description is abbreviated.

Comparator device 60 comprises a first comparator CP1 and a second comparator CP2. The first comparator CP1 receives the output from the first synchronous signal extractor 40 into its non-inverting port, while the output of second synchronous signal extractor 50 is supplied to the inverting port. These two signals are compared, and a first level control signal is generated to increase the amplitude of the 1H-delayed signal. Similarly, second comparator CP2 receives the output of synchronous signal extractor 40 at its inverting port and the output from the second synchronous signal extractor 50 at its non-inverting port and compares these two signals to generate a second level control signal for decreasing the amplitude of the 1H-delayed signal.

The output signal from first comparator CP1 is supplied to the positive input port of voltage-controlled amplifier 80 via resistor R5, while the output signal of second comparator CP2 is supplied to its negative input port 80 via resistor R6. Voltage-controlled amplifier 80 which is a commonly used circuit, increases amplification in response to the voltage signal supplied to the positive port and decreases the amplification in response to the voltage at the negative port, and in doing so, amplifies the 1H-delayed signal so that it matches the amplitude of the reproduced video signal. An exclusive NOR gate EOR, diodes D1 and D2, and transistors Q5 and Q6 constitute faulty operation preventing circuit 70 which mutes the signals supplied to voltage-controlled amplifier 80 when the outputs of first and second comparators CP1 and CP2 match, or when the drop-out detecting signal is generated in video reproducing block 10. This is to prevent any unnecessary amplification adjustment by voltage-controlled amplifier 80.

As described above, the drop-out compensator of the present invention can automatically adjust the level of a drop-out-compensated signal by comparing the level of the synchronous signal of a reproduced video signal with the level of the synchronous signal of a 1H-delayed signal and matching the amplitudes of 1H-delayed signal and the reproduced video signal, during the horizontal blanking period. Therefore, the compensating circuit of the present invention can provide a video signal with a better quality than that in accordance with the prior art.

While the invention has been particularly shown and described with reference to preferred embodiments thereof, it will be understood by those skilled in the art that various changes in form and details may be made therein without departing from the spirit and scope of the invention as defined by the claims.

What is claimed is:

1. A drop-out compensator for a video reproducing apparatus, comprising:
   switching means for selectively providing one of a reproduced video signal and an amplified delay signal in dependence upon receipt of a drop-out detecting signal;
   delay means for receiving and delaying one of said reproduced video signal and said amplified delay signal from said switching means to provide a delayed signal; and
   automatic level controlling means for extracting a synchronous reproduced video signal and a synchronous amplified delay signal from said reproduced video signal and said amplified delay signal, respectively, making a comparison between said synchronous reproduced video signal and said synchronous amplified delay signal, and adjusting an amplitude of said delayed signal in dependence upon the comparison to generate said amplified delay signal to be supplied to said switching means, said amplitude of said delayed signal being adjusted to match an amplitude of said reproduced video signal.

2. The drop-out compensator for a video reproducing apparatus as claimed in claim 1, wherein said automatic level controlling means comprises:
   first synchronous signal extractor means for extracting only said synchronous reproduced video signal from a first inverted video signal in response to a separated horizontal synchronous signal separated from said reproduced video signal;
   second synchronous signal extractor means for extracting only said synchronous amplified delay signal from a second inverted video signal in response to said separated horizontal synchronous signal;
   comparator means for making a comparison between said synchronous reproduced video signal and said synchronous amplified delay signal, and generating amplification control signals in dependence upon said comparison; and
   voltage controlled amplifier means for adjusting said amplitude of said delayed signal to match said amplitude of said reproduced video signal in response to said amplification control signals of said comparator means.

3. The drop-out compensator as claimed in claim 2, further comprised of said automatic level controlling means further comprising faulty operation preventing means for muting said amplification control signals of said comparator means supplied to said voltage controlled amplifier means in dependence upon said amplification control signals of said comparator means, and said drop-out detecting signal.

4. The drop-out compensator as claimed in claim 2, wherein said first synchronous signal extractor means receives said separated horizontal synchronous signal separated from said reproduced video signal.

5. The drop-out compensator as claimed in claim 2, wherein said second synchronous signal extractor means receives said separated horizontal synchronous signal separated from said reproduced video signal.

6. The drop-out compensator as claimed in claim 4, said first synchronous signal extractor means further comprising:
   first inverting means for inverting said reproduced video signal to provide said first inverted video signal; and
   first muting means for extracting said synchronous reproduced video signal from said first inverted video signal and outputting said synchronous reproduced video signal to said comparator means by selectively enabling transmission of said first inverted video signal in response to said separated horizontal synchronous signal.

7. The drop-out compensator as claimed in claim 5, wherein said second synchronous signal extractor means further comprises:
   second inverting means for inverting said amplified delay signal to provide said second inverted video signal; and
   second muting means for extracting said synchronous amplified delay signal from said second inverted video signal and outputting said synchronous amplified delay signal to said comparator means by selectively enabling transmission of said second inverted video signal in response to said separated horizontal synchronous signal.

8. The drop-out compensator as claimed in claim 2, said comparator means comprising:
   first comparing means having a first inverting port and a first non-inverting port for generating a first one of said amplification control signals after receiving said synchronous reproduced video signal at said first non-inverting port and receiving said synchronous amplified delay signal at said first inverting port; and
   second comparing means having a second inverting port and a second non-inverting port for generating a second one of said amplification control signals after receiving said synchronous reproduced video signal at said second inverting port and receiving said synchronous amplified delay signal at said second non-inverting port.

9. The drop-out compensator as claimed in claim 3, further comprising synchronous separator means for separating said separated horizontal synchronous signal from said reproduced video signal.

10. The drop-out compensator as claimed in claim 1, wherein said delay means delays said reproduced video signal for one horizontal scan line.

11. The drop-out compensator as claimed in claim 2, further comprising a video reproducing block for reproducing a composite video signal from a magnetic tape, and for generating said drop-out detecting signal.

12. The drop-out compensator as claimed in claim 2, further comprised of:
said first synchronous signal extractor means further comprising:
first inverting means for inverting said reproduced video signal to provide said first inverted video signal; and
first muting means for extracting said synchronous reproduced video signal from said first inverted video signal by selectively enabling transmission of said first inverted video signal in response to said separated horizontal synchronous signal; and
said second synchronous signal extractor means further comprising:
second inverting means for inverting said amplified delay signal to provide said second inverted video signal; and
second muting means for extracting said synchronous amplified delay signal from said second inverted video signal by selectively enabling transmission of said second inverted video signal in response to said separated horizontal synchronous signal.

13. The drop-out compensator as claimed in claim 2, further comprised of:
said first synchronous signal extractor means comprising:
first inverting means for inverting said reproduced video signal to provide said first inverted video signal; and
first muting means for extracting said synchronous reproduced video signal from said first inverted video signal by selectively enabling transmission of said first inverted video signal in response to said separated horizontal synchronous signal;
said second synchronous signal extractor means comprising:
second inverting means for inverting said amplified delay signal to provide said second inverted video signal; and
second muting means for extracting said synchronous amplified delay signal from said second inverted video signal by selectively enabling transmission of said second inverted video signal in response to said separated horizontal synchronous signal; and
said comparator means comprising:
first comparing means having a first non-inverting port and a first inverting port for generating a first one of said amplification control signals by receiving said synchronous reproduced signal at said first non-inverting port and receiving said synchronous amplified delay signal at said first inverting port; and
second comparing means having a second non-inverting port and a second inverting port for generating a second one of said amplification control signals by receiving said synchronous reproduced video signal at said second inverting port and receiving said synchronous amplified delay signal at said second non-inverting port.

14. A dropout compensator for a video reproducing apparatus, comprising:
delay means for delaying a reproduced video signal to generate a delayed signal;
voltage controlled amplifier means for generating an amplified delay signal in response to first and second amplification control signals;
switching means for selectively providing one of said reproduced video signal and said amplified delay signal in response to a drop-out detecting signal;
first inverting means for inverting said reproduced video signal to generate an inverted reproduced video signal;
second inverting means for inverting said amplified delay signal to generate an inverted amplified delay signal;
first muting means for extracting and providing a first synchronous output signal by selectively enabling transmission of said inverted reproduced video signal in response to a separated horizontal synchronous signal separated from said reproduced video signal;
second muting means for extracting and providing a second synchronous output sisal by selectively enabling transmission of said inverted amplified delay signal in response to said separated horizontal synchronous signal;
first comparator means having a first non-inverting port and a first inverting port for generating said first amplification control sisal by comparing said first synchronous output signal received at said first non-inverting port with said second synchronous output signal received at said first inverting port;
second comparator means having a second non-inverting port and a second inverting port for generating said second amplification control signal by comparing said first synchronous output signal received at said second inverting port with said second synchronous output signal received at said second non-inverting port; and
said voltage controlled amplifier means generating said amplified delay signal by adjusting an amplitude of said delayed signal in response to said first and second amplification control signals.

15. The dropout compensator as claimed in claim 14, further comprising a means for muting said first and second amplification control signals of said first and second comparator means, respectively, and for applying said first and second amplification control signals to said voltage controlled amplifier means in dependence upon a comparison between said first and second amplification control signals, and receipt of said drop-out detecting signal.

16. A dropout compensating method for compensating for a portion of a reproduced video signal having a reduced amplitude in a video reproducing apparatus, said method comprising the steps of:

delaying said reproduced video signal to generate a delayed signal;

extracting a separated synchronous signal from said reproduced video signal;

extracting and providing only a first synchronous output signal by muting said reproduced video signal in response to said separated synchronous signal;

extracting and providing only a second synchronous output signal by muting an amplified signal in response to said separated synchronous signal;

comparing said first and second synchronous output signals to generate amplification control signals;

adjusting an amplitude of said delayed signal in dependence upon said amplification control signals to generate said amplified signal; and alternately enabling transmission of said reproduced video signal and said amplified signal in response to a drop-out detecting signal to generate a compensated signal, said compensated signal including a portion to compensate for said portion of said reproduced video signal having the reduced amplitude.

17. The drop-out compensating method as claimed in claim 16, further comprising a step of muting said amplification control signals in dependence upon a comparison between said amplification control signals and generation of said drop-out detecting signal.

18. A dropout compensator for a video reproducing apparatus, comprising:

delay means for delaying a reproduced video signal to generate a delayed signal;

voltage-controlled amplifier means for adjusting an amplitude of said delayed signal to generate an amplified delayed signal;

switching means for alternately enabling transmission of one of said reproduced video signal and said amplified delayed signal in response to a drop-out detecting signal indicating that a portion of said reproduced video signal has a reduced amplitude, said drop-out detecting signal having a pulse width corresponding to said portion of said reproduced video signal having the reduced amplitude;

first muting means for extracting and providing a first synchronous output signal corresponding to said reproduced video signal by selectively enabling transmission of said reproduced video signal in response to a separated synchronous signal;

second muting means for extracting and providing a second synchronous output signal corresponding to said amplified delayed signal by selectively enabling transmission of said amplified delayed signal in response to said separated synchronous signal;

first comparator means having a first non-inverting port and a first inverting port for generating a first amplification control signal by receiving said first synchronous output signal at said first non-inverting port and receiving said second synchronous output signal at said first inverting port; and second comparator means having a second non-inverting port and a second inverting port for generating a second amplification control signal by receiving said first synchronous output signal at said second inverting port and receiving second synchronous output signal at said second non-inverting port;

said voltage controlled amplifier means adjusting said amplitude of said delayed signal in response to said first and second amplification control signals.

19. The dropout compensator as claimed in claim 18, further comprising means for muting said first and second amplification control signals of said first and second comparator means, respectively, and for applying said first and second amplification control signals to said voltage controlled amplifier means in dependence upon a comparison between said first and second amplification control signals, and receipt of said drop-out detecting signal.

20. The drop-out compensator as claimed in claim 18, wherein said first and second muting means are turned off during a horizontal synchronous period of said reproduced video signal.

21. The drop-out compensator as claimed in claim 20, wherein said separated synchronous signal comprises a horizontal synchronous signal.

22. A drop-out compensator for a video reproducing apparatus, comprising:

delay means for delaying a reproduced video signal to generate a delayed signal;

voltage-controlled amplification means for adjusting an amplitude of said delayed signal to generate an amplified delay signal;

switching means for selectively providing one of said reproduced video signal and said amplified delay signal in response to a drop-out detecting signal indicating that a portion of said reproduced video signal has a reduced amplitude, said drop-out detecting signal having a pulse width corresponding to said portion of said reproduced video signal having the reduced amplitude;

inverting means for inverting said reproduced video signal to generate an inverted reproduced video signal, and for inverting said amplified delay signal to generate an inverted amplified delay signal;

muting means for extracting and providing a first synchronous output signal by selectively enabling transmission of said inverted reproduced video signal in response to a separated synchronous signal, and for extracting and providing a second synchronous output signal by selectively enabling transmission of said inverted amplified delay signal in response to said separated synchronous signal; and comparator means having first and second inverting ports and first and second non-inverting ports for generating a first amplification control signal by inputting said first synchronous output signal to said first non-inverting port and inputting said second synchronous output signal to said first inverting port, and for generating a second amplification control signal by inputting said first synchronous output signal to said second inverting port and inputting said second synchronous output signal to said second non-inverting port;

said voltage controlled amplification means adjusting said amplitude of said delayed signal in response to said first and second amplification control signals.

* * * * *

UNITED STATES PATENT AND TRADEMARK OFFICE
CERTIFICATE OF CORRECTION

PATENT NO. : 5,398,114
DATED : 14 March 1995
INVENTOR(S) : Hong-Kyu HAN

It is certified that error appears in the above-indentified patent and that said Letters Patent is hereby corrected as shown below:

| | | |
|---|---|---|
| Column 1, | line 15, | after "FM", delete "signal"; |
| | line 21, | after "when", delete a comma " , "; |
| | line 36, | after "who", change "adjusts, the level" to --adjusts the level,--; |
| | line 37, | after "particular", insert a comma -- , --; |
| | line 59, | before "device", insert --switching--; |
| Column 2, | line 9, | after "signal", change " , " to a period -- . --; |

UNITED STATES PATENT AND TRADEMARK OFFICE
CERTIFICATE OF CORRECTION

PATENT NO. : 5,398,114
DATED : 14 March 1995
INVENTOR(S) : Hong-Kyu HAN

It is certified that error appears in the above-indentified patent and that said Letters Patent is hereby corrected as shown below:

Column 6,   line 35,   after "output", change "sisal" to --signal--;

line 41,   afetr "control", change "sisal" to --signal--:

Signed and Sealed this

Twenty-seventh Day of August, 1996

Attest:

BRUCE LEHMAN

*Attesting Officer*   *Commissioner of Patents and Trademarks*